United States Patent [19]

Habelt et al.

[11] Patent Number: 4,940,994

[45] Date of Patent: Jul. 10, 1990

[54] THERMAL PRINTER

[75] Inventors: Gerhard Habelt; Franz Mucha, both of Vienna, Austria

[73] Assignee: US Philips Corporation

[21] Appl. No.: 345,393

[22] Filed: May 1, 1989

[30] Foreign Application Priority Data

May 3, 1988 [AT] Austria ................................ 1147/88

[51] Int. Cl.[5] ........................ G01D 15/10; B41J 11/08

[52] U.S. Cl. ................................ 346/76 PH; 400/656; 400/657; 400/648; 400/58

[58] Field of Search ................. 400/656, 648, 657, 58; 346/76 PH

[56] References Cited

U.S. PATENT DOCUMENTS 4,358,776 11/1982 Yoshihiro ....................... 346/76 PH
4,692,778 9/1987 Yoshimura et al. ................ 346/145

FOREIGN PATENT DOCUMENTS 2908946 9/1979 Fed. Rep. of Germany .
0011377 1/1985 Japan .................................. 400/656
0244570 10/1986 Japan ............................. 346/76 PH

OTHER PUBLICATIONS

J. L. Regehr et al., "Single Circuit/Head Assembly for Nonimpact Printer" IBM Technical Disclosure Bulletin, vol. 22, No. 4, p. 1593, Sep. 1979.

*Primary Examiner*—Bruce A. Reynolds
*Assistant Examiner*—Huan Tran

[57] ABSTRACT

A thermal printer which includes a thermal print head (15) which is displaceable in the line direction and a print bar (6) which extends in the line direction, the print bar being located opposite the print head and being pivotable about an axis parallel to the line direction. A supporting part (19) of the print bar constitutes an abutment for the print head, and is connected by an elongated resilient hinge part (20) to a mounting part (21) of the print bar.

3 Claims, 2 Drawing Sheets

THERMAL PRINTER

BACKGROUND OF THE INVENTION

1. Field of the Invention

The invention relates to a thermal printer comprising a thermal print head displaceable in the line direction and a print bar which serves as an abutment for the print head, the print bar extending in the line direction and being located opposite to the print head, the print bar being arranged so that it can be pivoted about an axis parallel to the line direction. The print bar has a supporting part and a ruler-shaped mounting part, one of the major surfaces of the supporting part constituting the abutment and consisting of an elastic material.

2. Description of the Related Art

In a known thermal printer (German Patent 2908946) the print bar is constructed so that it can be pivoted about an axis parallel to the line direction in order that it can be adapted to the thermal print head with regard to its position, so that a perfect abutment for the print head is formed. In such a known thermal printer the print bar comprises a frame, on one surface of which a supporting part is secured, which forms an abutment of elastic material and is also ruler-shaped.

A disadvantage of the known thermal printer is the complicated construction of the print bar.

SUMMARY OF THE INVENTION

The invention has for its object to provide a thermal printer with a particularly simple construction of the print bar, a reliable and simple pivot of the print bar, and a simple mounting of the print bar to the thermal printer.

In a thermal printer according to the invention the supporting part of the print bar is connected to a stationary ruler-shaped mounting part by means of at least one resilient elongated hinge part, said hinge part projecting centrally from the supporting and mounting part. Thus, the hinge part connecting the supporting part with the mounting part constitutes a pivot shaft, about which the supporting part can be pivoted about an axis parallel to the line direction, as a result of which it can be adapted to the print head with regard to its position in a simple and reliable manner. As is apparent, no separate measures are therefore required to constitute on the side of the printer a pivot shaft for pivoting the print bar, because the supporting part of the print bar can be pivoted in a simple and reliable manner due to its resilient hinge part. Further, the print bar can be mounted on the side of the printer in a very simple manner because only its mounting part must be held on the side of the printer, for which purpose there are available a series of possibilities, such as sticking or clamping.

It is particularly advantageous if the supporting part, the hinge part and the mounting part are manufactured as an integral synthetic resin part.

Due to such a construction, the print bar can be manufactured in a simple manner in one processing step.

It is further advantageous if the hinge part of the print bar is formed by a plate spring which is attached on one side to the supporting part and on the other side to the mounting part of the print bar.

As a result thereof, a simple construction of the print bar is obtained, while, for example, when the supporting part and the mounting part are constructed of synthetic material, these parts can be injection-moulded in one processing step to the plate spring. Also in this case, no special expensive measures are required to obtain pivotability of the print bar about an axis parallel to the line direction and its mounting on the side of the printer.

BRIEF DESCRIPTION OF THE DRAWINGS

The invention will now be described more fully with reference to the accompanying drawings, in which.

DESCRIPTION OF THE PREFERRED EMBODIMENTS

Figure 1:
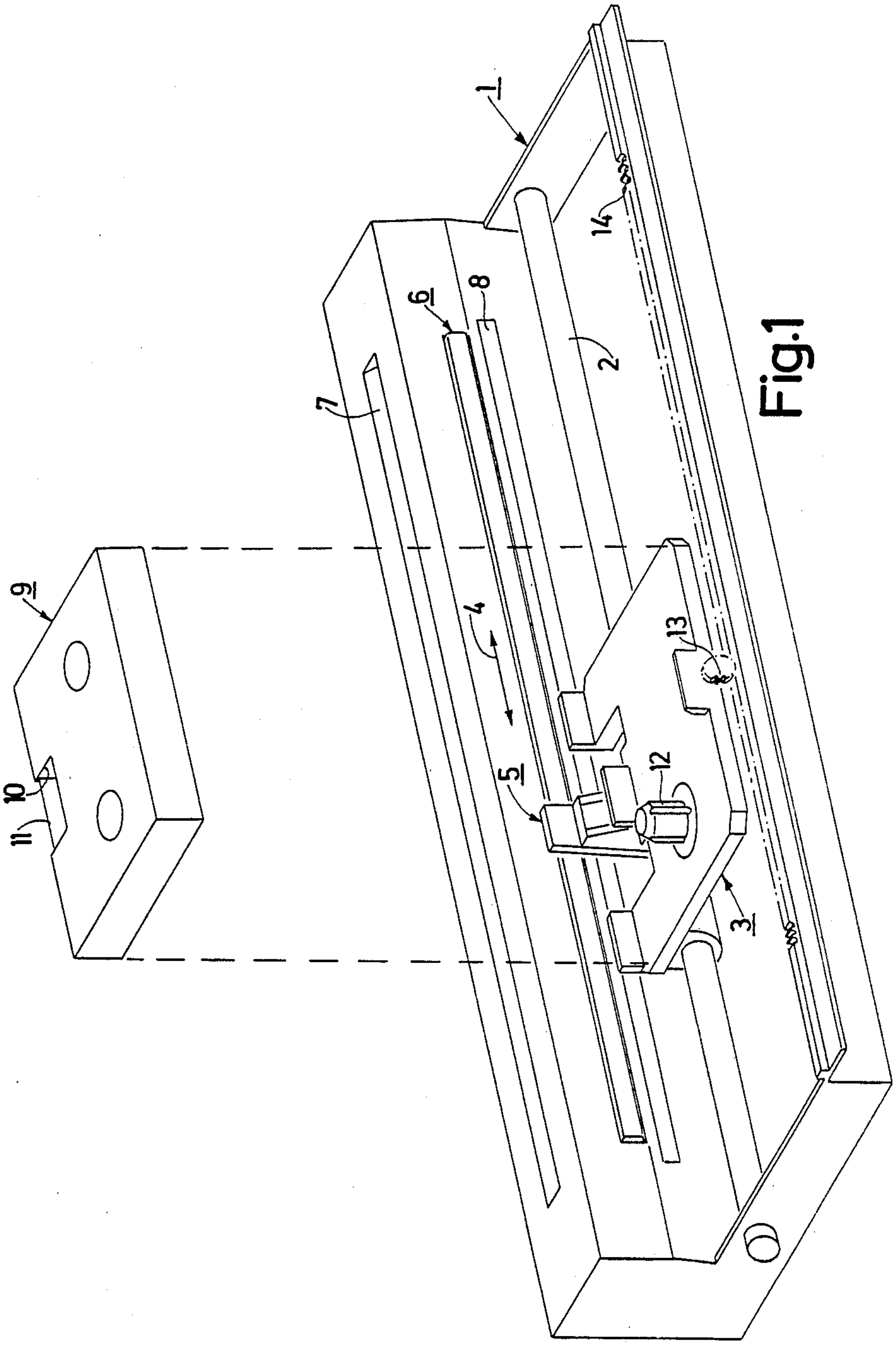
FIG. 1 is an oblique perspective view of the construction of an embodiment of the thermal printer comprising a print bar which extends parallel to the line direction and along which a print head is displaceable.

In FIG. 1, reference numeral 1 designates the frame of a thermal printer, which has a carriage 3 displaceable along a rod 2 arranged on the frame. This carriage 3 is displaceable by driving means (not shown here further), such as, for example, a pulling rope or a toothed belt, in the line direction indicated by the double arrow 4. Together with this carriage 3, a carrier 5 is displaceable along the rod 2, on which carrier a thermal print head is arranged, which is located opposite to a print bar 6, which also extends in the line direction. The print head is arranged on the frame 1 on the side of the carrier 5 which is not visible in FIG. 1. By means of a device not shown, such as, for example, an electromagnet, and carrier 5 and hence the print head can be pivoted from a starting position extending at a certain distance from the print bar 6 towards the print bar 6 into a working position for the print head, at which the print bar 6 constitutes with the interposition of a record carrier and a colour strip an abutment for the print head. Such a record carrier, such as, for example, a sheet of paper, can be inserted into an inlet slot 7 of the printer, it being gripped by a transport device and being driven for pulling into the printer or for linewise feeding, and then leaving the thermoprinter through an output slot 8 provided at the area of the print bar 6 and extending between the print bar 6 and the carrier 5 or the print head.

A colour strip cassette 9 can further be arranged on the carriage 3 and is provided in usual manner with a recess 10 in which the carrier 5 with the print head can be accomodated in order to engage behind a colour strip 11 arranged in the cassette 9. For driving the colour strip 11, such as an ink ribbon, a rotatable winding mandrel 12 is provided on the carriage 3 which can engage the cassette 9 and drive a winding core for winding such ink ribbon. Such a drive for the colour strip 11 is derived, for example, from the movement of displacement during the carriage 3, a toothed wheel 13 provided on the carriage 3 engaging a rack 14 arranged on the chassis 1 of the printer and rolling upon displacement of the carriage 3 along said rack and thus transmitting a rotary movement through a driving device (not shown) to the winding mandrel 12.

In the operating condition of the printer, the record carrier and the colour strip are therefore located between the print bar 6 and the carrier 5 for the print head, the colour strip being adjacent to the print head and the record carrier being adjacent to the print bar 6.

If symbols are to be printed on the record carrier by the print head, the print head is pivoted by means of the carrier 5 towards the print bar 6, the print bar 6 constituting an abutment for the print head, the colour strip and the record carrier. For a perfect printing process, it is essential that the print head fully engages the colour strip and the colour strip in turn fully engages the record carrier. This can be achieved if the print bar 6 can be adapted to the position of the print head, for which purpose it is arranged on the printer in such a manner that in known manner it can be pivoted about an axis parallel to the line direction.

Figure 2:
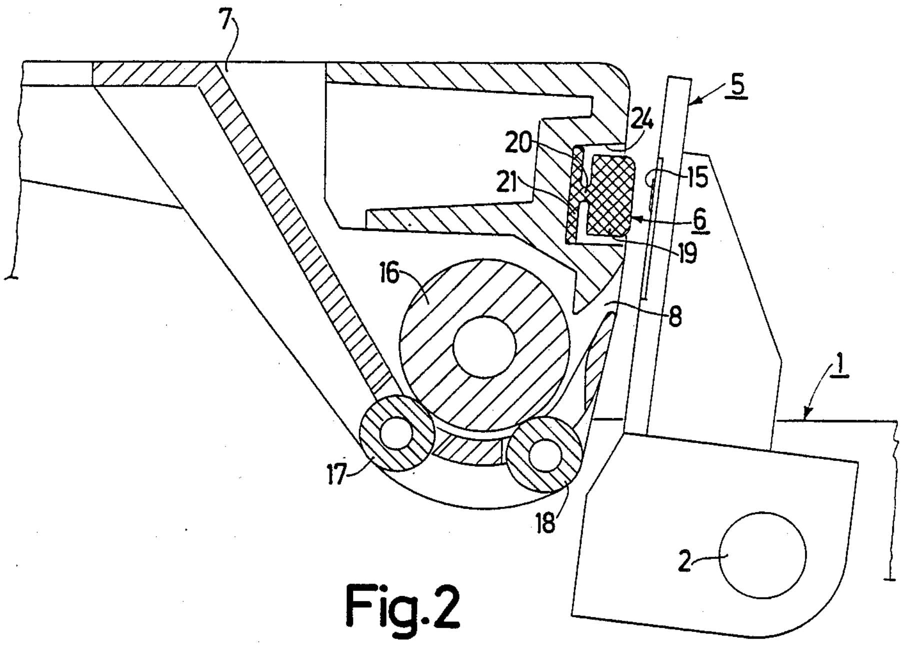
FIG. 2 shows a sectional view of the printer of FIG. 1 in a plane transverse to the line direction and a cut-out part thereof around the area of the print bar.

FIG. 2 shows an embodiment wherein the print bar 6 is arranged on the printer so that it can be pivoted; the print head 15 being arranged on the carrier 5. Further, FIG. 2 also shows an embodiment of a transport device for a record carrier, which in this case consists of a driving roller 16, which can be driven and cooperates with two counter-pressure rollers 17 and 18, a record carrier inserted into the inlet slot 7 being pulled inwards between the driving roller 16 and the counterpressure rollers 17 and 18 until it emerges through the outlet slot 8 and further extends at the area between the print bar 6 and the print head 15.

Figure 3:
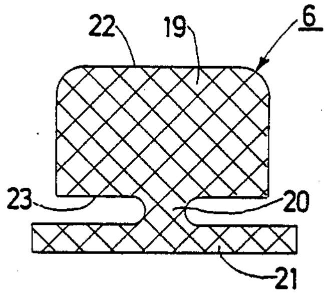
FIG. 3 shows the print bar of FIG. 2 on an enlarged scale.

In the present case, the print bar 6, which is also shown in FIG. 3 by itself on an enlarged scale, is constituted by a supporting part 19, which is connected through a hinge part 20 to a mounting part 21. The elongated hinge part 20 extending parallel to the line direction projects centrally from the surface 23 of the supporting part 19 located opposite to the major surface 22 constituting the abutment for the print head 15 and is in turn connected centrally to the mounting part 21, which is itself ruler-shaped and extends parallel to the supporting part 19. As is apparent, the supporting part 19 and the hinge part 20 as well as the mounting part 21 are manufactured as an integral synthetic resin part. As a result of this the elasticity required for the abutment for the print head 15 can be imparted to the supporting part 19. The hinge part 20 is thus constructed so as to be resilient in itself and then operates like a so-called film hinge, as a result of which the supporting part 19 can be pivoted with respect to the mounting part 21 about an axis parallel to the longitudinal direction of the latter extending in the line direction. By means of the mounting part 21, the print bar 6 is secured on the side of the printer to the frame 1, for which purpose, for example, the frame 1 may have a groove-shaped depression 24, to whose bottom surface, for example, the mounting part 21 is adhered, in which event the supporting part 19, located opposite to the print head 15, projects from the groove-shaped depression 24.

As is apparent, such a print bar 6 has a very simple construction because it is manufactured as an integral part, no additional measures being required for a pivotable arrangement of its supporting part because this is ensured directly by the resilient hinge part 20. By providing such a hinge part 20, a perfect and reliable pivotability of the supporting part 19 of the print bar 6 about an axis parallel to the line direction is achieved so that the supporting part 19 can be adapted satisfactorily to the respective positions of the print head, which is very important for a high printing quality. The print bar 6 can also be mounted very simply on the side of the printer because it only need be ensured that its mounting part 21 is adhered. Of course, various other possibilities are available for holding secured the mounting part 21; for example it may be secured by clamping or screwing.

With respect to the construction of the hinge part 20 like a film hinge, it is to be rated that this hinge part 20 can extend preferably throughout the length of the print bar 6. However, it would also be possible without further expedients to connect the supporting part 19 by means of several hinge part sections extending in the line direction and consecutively arranged in the line direction to the mounting part 21. Further, it should be noted that in case it is desirable to impart to the supporting part 19, the hinge part 20 or the mounting part 21 of the print bar 6 individually different material properties, the print bar 6 can still be manufactured as an integral part by a multistage injection moulding process.

Figure 4:
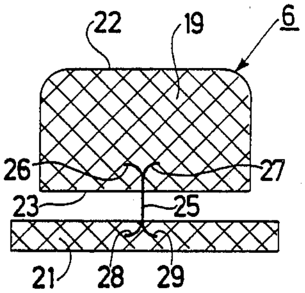
FIG. 4 shows a second embodiment of the print bar.

In the embodiment shown in FIG. 4, the print bar 6 again consists of a supporting part 19 and a mounting part 21, which are interconnected by a resilient hinge part, which, however, is constituted in this case by a plate spring 25 which extends parallel to the line direction, as a result of which the supporting part 19 again can be pivoted with respect to the mounting part 21 about an axis parallel to the line direction. The connection of the plate spring 25 on one side with the supporting part 19 and on the other side with the mounting part 21 is established in this case in that its ends are embedded in both parts, the connection being further strengthened in that sections 26 and 27 and 28 and 29, respectively, are provided, which are bent from the ends of the plate spring 25 in opposite directions and are alternately consecutively arranged in the line direction. The manufacture of such a print bar 6 can be effected in such a manner that the plate spring 25 is arranged in an injection mould, in which the supporting part 19 and the mounting part 21 are then formed by injection moulding around the ends of the plate spring 25. Also in this case, instead of a single plate spring 25 extending in the line direction, several plate spring sections consecutively arranged in the line direction could be provided. The print bar 6 is again mounted on the frame 1 on the side of the printer again in a simple manner by securing means engaging its mounting part 21.

We claim:

1. A thermal printer comprising a thermal print head displaceable in the line direction of the printer and a print bar which serves as an abutment for the print head, the print bar extending in the line direction and being located opposite to the print head, said print bar being arranged so that it can be pivoted about an axis parallel to the line direction and comprising a supporting part and a ruler-shaped mounting part, one of the major surfaces of said supporting part constituting said abutment, said supporting part consisting of an elastic material; characterized in that said supporting part of the print bar is connected to said ruler-shaped mounting part thereof by means of at least one resilient elongated hinge part, said hinge part projecting centrally from the supporting and mounting parts.

2. A thermal printer as claimed in claim 1, characterized in that said print bar with its supporting part, its hinge part and its mounting part is manufactured as an integral synthetic resin part.

3. A thermal printer as claimed in claim 1, characterized in that the hinge part of the print bar is formed by a plate spring which is attached on one side to the supporting part and on the other side to the mounting part of the print bar.

* * * * *